United States Patent [19]

Furukawa et al.

[11] 4,079,702

[45] Mar. 21, 1978

[54] ECONOMIZER UTILIZING EXHAUST GAS

[75] Inventors: Takaaki Furukawa, Yokohama; Kenzi Ozaka, Minaminagasaki, both of Japan

[73] Assignees: Ishikawajima-Harima Jukogyo Kaisha, Ote; Tokushu Shunsetsu Kabushiki Kaisha, Tokyo, both of Japan

[21] Appl. No.: 717,913

[22] Filed: Aug. 26, 1976

[30] Foreign Application Priority Data

Sep. 10, 1975  Japan .................................. 50-125115

[51] Int. Cl.² .................... F22D 1/02; F22B 37/24; F28F 19/02
[52] U.S. Cl. ................................. 122/421; 122/510; 165/133; 165/134
[58] Field of Search ................. 165/133, 134; 122/510, 122/420, 421

[56] References Cited

U.S. PATENT DOCUMENTS

| | | | |
|---|---|---|---|
| 1,919,192 | 7/1933 | Behr | 122/421 |
| 2,412,568 | 12/1946 | Donahue et al. | 122/510 |
| 3,231,014 | 1/1966 | Koenig | 165/133 |
| 3,918,411 | 11/1975 | Wolowodiuk | 122/494 |

Primary Examiner—Kenneth W. Sprague
Attorney, Agent, or Firm—Scrivener, Parker, Scrivener & Clarke

[57] ABSTRACT

The present invention discloses an economizer for absorbing heat of combustion products, wherein the surfaces of a series of continuous tubes extended through an exhaust gas pipe or duct are lined with glass pipes, the clearance between the exhaust pipe or duct wall and the tubes extended therethrough is sealed with gaskets, and water is circulated through the tubes.

3 Claims, 7 Drawing Figures

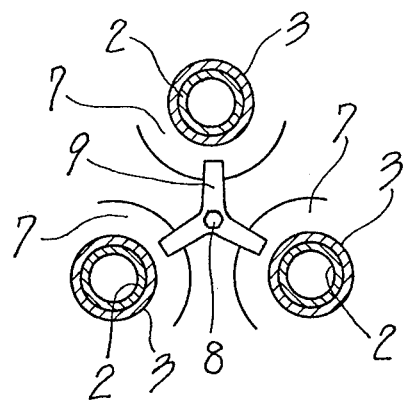
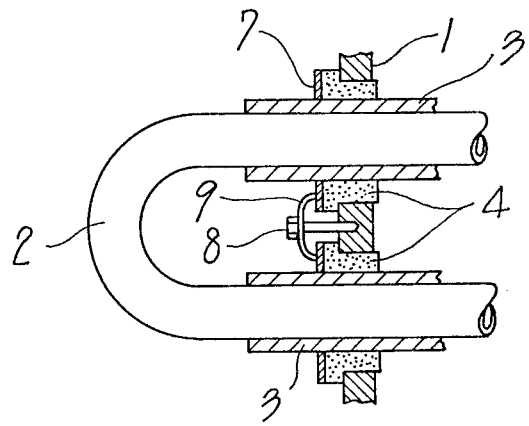
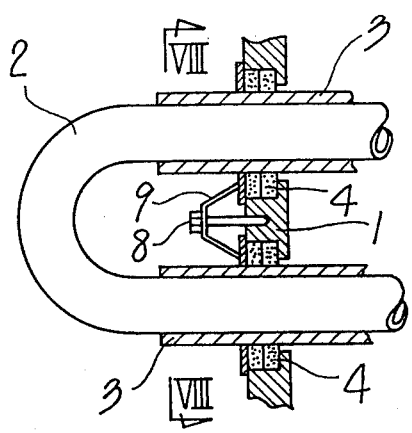
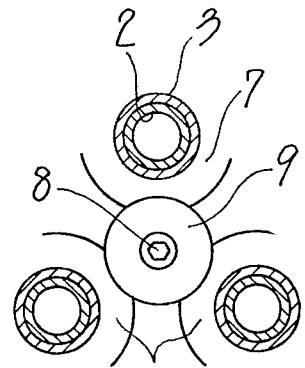
FIG. 4
FIG. 5
FIG. 6
FIG. 7

ECONOMIZER UTILIZING EXHAUST GAS

DETAILED DESCRIPTION OF THE INVENTION

The present invention relates to an economizer for absorbing or recovering heat of the exhaust gases discharged from diesel engines or boilers, thereby increasing the thermal efficiency of the engines or boilers and attaining savings of thermal energy.

In general, the prior art economizers have not been adapted for recovering low temperature heat of combustion products discharged through an exhaust gas pipe because the bare tubes are subjected to corrosion by sulfuric acid when the temperature of heat of combustion products is low (about less than 200° C). Therefore in the ships with a main diesel engine output of less than 20,000 PS and with a cargo loading capacity of less than 65,000 tons, a small capacity diesel-engine driven generator must be additionally mounted in order to supply the electric power required during the voyage because the steam required for driving a turbine of a generator cannot be obtained. As a result, fuel has been uneconomically consumed in excessive quantity.

The present invention is made to overcome the above and other problems encountered in the prior art economizers, and has for its object to provide an economizer for absorbing heat of products of combustion, wherein the surface of tubes exposed to exhaust gases are lined with glass pipes, and the clearence between the exhaust pipe wall and tubes are sealed with gaskets.

The present invention will become more apparent from the following description of some preferred embodiments thereof taken in conjunction with the accompanying drawings, in which;

FIG. 4 is a sectional view thereof taken along the line V—V of FIG. 3;

FIG. 5 is a view similar to FIG. 3 but illustrating a second embodiment of the present invention;

FIG. 6 is also a view similar to FIG. 3 but illustrating a third embodiment of the present invention; and FIG. 7 is a sectional view taken along the line VIII—VIII of FIG. 6.

Figure 1:
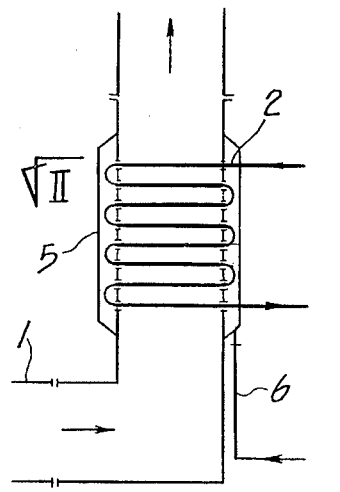
FIG. 1 is a schematic view of a first embodiment of an economizer in accordance with the present invention.

Referring first to FIG. 1, a tube 2 is extended in the form of a hair pin through a suitable section of an exhaust pipe 1 to form a series of continuous tubes 2, and the outer surfaces of the continuous tubes 2 inside the exhaust pipe 1 are closely lined with glass pipes 3 by heat application. (See FIG. 3). One end of the tube 2 is communicated with a water supply, while the other end with suitable means for utilizing recovered heat. The inner wall surface of the exhaust pipe 1 is coated with, for instance, phenol resin capable of resisting heat and acid.

Figure 2:
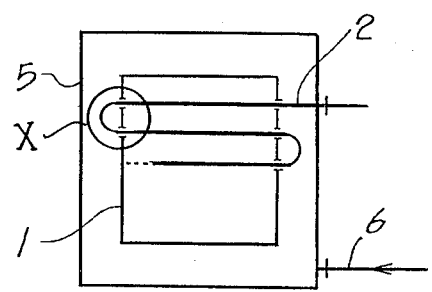
FIG. 2 is a sectional view, on enlarged size, taken along the line II of FIG. 1.
Figure 3:
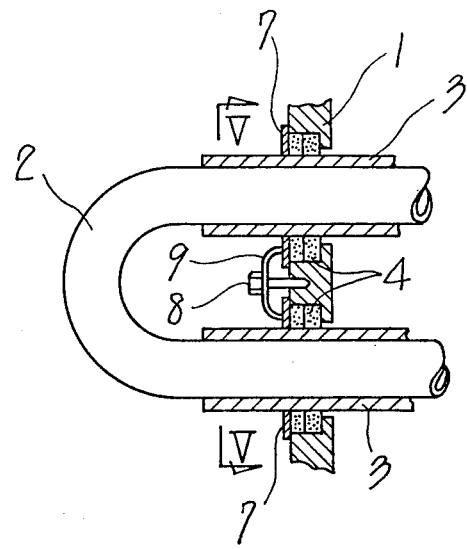
FIG. 3 is an enlarged view of a portion X in FIG. 2 illustrating the arrangement of sealing of a tube extended through the wall of an exhaust pipe.

As shown in FIGS. 3 and 4, each of the openings of the exhaust gas wall through which the continuous tubes 2 are extended is coaxially stepped in a suitable number. The opening is shown as having one step; that is, the opening consists of an outer small-diameter section and an inner large-diameter section next to the small diameter section. A plurality of layers of gaskets 4 (two, in the embodiment) of airtightness and good heat- and corrosion-resistance and of a material (teflon, glass fiber etc.) for protecting the glass pipe in close contact with the tube against vibration and shock, are placed in the large diameter section around the tube 2 and are securely held in position with a gasket retainer 7 pressed forcibly against the inner gasket 4 with a bolt 8 and three-leg bridge washer 9 which bridges the adjacent gasket retainers 7 as best shown in FIG. 4. And as best shown in FIG. 2 the U-shaped bends of the continuous tubes 2 are surrounded with an outer case or pipe 5 to prevent the leakage and radiation into the surrounding atmosphere of the exhaust gases leaking through the gaskets 4. The space defined between the exhaust pipe 1 and the outer case or pipe 5 is communicated through an air feed pipe 6 with a suitable air supply source so that air under a pressure higher than the pressure of the exhaust gases discharged through the exhaust pipe 1 may be forced into the space to prevent the corrosion by sulfuric acid contained in the exhaust gases.

The economizer with the above construction can efficiently absorb the low temperature heat of combustion products discharged from a diesel engine or boiler so that steam is generated in the continuous tubes 2 and fed to, for instance, a turbine. The glass pipes 3 on the continuous tubes 2 are capable of resisting heat, and any density of sulfuric acid and the air under pressure is forced into the space between the exhaust pipe 1 and the outer case or pipe 5 so that the corrosion of the continuous tubes 2 by sulfuric acid may be completely eliminated, and accordingly a long service life of tubes 2 may be guaranteed.

In the second embodiment shown in FIG. 5, a flanged gasket 4 is used and inserted into the opening of the exhaust pipe from the outside to seal the tube 2 and securely retained in position with the gasket retainer 7 pressed against the gasket 4 with the bolt 8 and the bridge washer 9 as with the case of the second embodiment.

The third embodiment shown in FIG. 6 and 7 is substantially similar in arrangement to the second embodiment shown in FIGS. 4 and 5 except that instead of the three-leg bridge washer 9, a frustoconical bridge washer 9 is used.

The outer wall surfaces of the exhaust pipe 1, the inner wall surfaces of the outer case or pipe 5 and the U-shaped bends of the continuous tubes 2 may be applied with heat-resisting and acid-resisting coatings so that the corrosion by sulfuric acid may be prevented without the introduction of air under pressure into the space between the exhaust pipe 1 and the outer case or pipe 5.

It will be understood that the present invention is not limited to the above embodiments and that various modifications can be effected without departing from the true spirit of the present invention. For instance, the tubes 2 may be so arranged as to intersect each other at 90° or any other desired angles.

As described above, according to the present invention the continuous tubes 2 inside the exhaust pipe 1, which are most important elements for an economizer and of which the outer surfaces are easier for sulfuric acid to condense thereon, are lined with glass of resisting heat and any density of sulfuric acid so that even when $SO_x$ in the exhaust gases should be condensed on the surfaces of the continuous tubes 2 at temperatures less than 200° C, the corrosion of the tubes 2 may be prevented so that a long service life of tubes may be ensured. Furthermore the economizers of the present invention are simple in design, construction and assembly and are capable of absorbing relatively low temperature heat of products of combustion over a required temperature range so that the thermal efficiency of the diesel engines and boilers may be increased and accordingly considerable savings in fuel may be attained.

What is claimed is:

1. An economizer comprising an exhaust pipe having its inner wall surface coated with a heat resisting and corrosion-resisting material for transmitting high-temperatured exhaust gases containing corrosive materials such as SOx, a tube communicated with a water supply and extended through the exhaust pipe with clearance and bent to form a series of continuous parallel tube sections, said tube being closely lined with glass pipes by heat application on its surfaces inside the exhaust pipes so that the covering glass pipes are exposed to the exhaust gases, at least one heat-resisting and corrosion-resisting gasket for sealing inserted into each clearances between the tubes and the wall of the exhaust pipe, said gasket being securely held in position with a gasket retainer pressed forcibly against the gasket with a bolt and a bridge washer capable of bridging adjacent gasket retainers, and an outer casing or pipe fitted over said exhaust pipe so as to airtightly enclose therein the bends of the tubes extended out of the exhaust pipe.

2. An economizer as set forth in claim 11 wherein air under pressure higher than the pressure of the exhaust gases is forced into the space defined between said exhaust pipe and said outer casing.

3. An economizer as set forth in claim 1 wherein, in said space defined between said exhaust pipe and said outer casing, the outer surfaces of said exhaust pipe, the inner wall surfaces of said outer casing and the outer surfaces of the tube extended out of said exhaust pipe are applied with heat-resisting and corrosion-resisting coatings.

* * * * *

UNITED STATES PATENT OFFICE
CERTIFICATE OF CORRECTION

Patent No. 4,079,702　　　　　　　　　Dated March 21, 1978

Inventor(s) Furukawa, Takaaki; and Ozaka, Kenzi

It is certified that error appears in the above-identified patent and that said Letters Patent are hereby corrected as shown below:

Change the Assignee on the Patent as follows:

"Ishikawajima-Harima Jukogyo Kabushiki Kaisha, of Tokyo, Japan".

Signed and Sealed this

Twelfth Day of September 1978

[SEAL]

Attest:

RUTH C. MASON
*Attesting Officer*

DONALD W. BANNER
*Commissioner of Patents and Trademarks*